United States Patent
Ramoutar et al.

(10) Patent No.: US 11,691,485 B2
(45) Date of Patent: Jul. 4, 2023

(54) COMBINATION INTERIOR TRIM AND REINFORCEMENT FOR EXTERIOR RESIN PANE

(71) Applicant: TOYOTA MOTOR ENGINEERING & MANUFACTURING NORTH AMERICA, INC., Plano, TX (US)

(72) Inventors: Naipaul D. Ramoutar, Ann Arbor, MI (US); Valerie Schnabelrauch, Ypsilanti, MI (US); Jonathan R. Young, Saline, MI (US); William Brian Deming, Fenton, MI (US); Hiroki Sawa, Nagakute (JP); Kelly L. T. Harbison, Canton, MI (US); Jonathan Quijano, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 112 days.

(21) Appl. No.: 16/925,325

(22) Filed: Jul. 9, 2020

(65) Prior Publication Data
US 2022/0009326 A1    Jan. 13, 2022

(51) Int. Cl.
*B60J 5/10* (2006.01)
*B60J 5/12* (2006.01)
(Continued)

(52) U.S. Cl.
CPC ........... *B60J 5/107* (2013.01); *B60R 13/0243* (2013.01); *B60J 5/0456* (2013.01); *B60J 5/0458* (2013.01); *B60J 5/0461* (2013.01)

(58) Field of Classification Search
CPC ........ B60J 5/0456; B60J 5/0458; B60J 5/107; B60R 13/0243
See application file for complete search history.

(56) References Cited

U.S. PATENT DOCUMENTS

| | | | | |
|---|---|---|---|---|
| 4,848,829 A | * | 7/1989 | Kidd | ................... B60R 16/0207 |
| | | | | 174/72 A |
| 5,111,619 A | * | 5/1992 | Billin | ................... B60R 13/0206 |
| | | | | 24/297 |

(Continued)

FOREIGN PATENT DOCUMENTS

| | | |
|---|---|---|
| DE | 102004023396 | 12/2005 |
| DE | 602006001043 | 5/2009 |

(Continued)

*Primary Examiner* — Phi D A
(74) *Attorney, Agent, or Firm* — Sheppard, Mullin, Richter & Hampton LLP; Hector A. Agdeppa; Daniel N. Yannuzzi

(57) ABSTRACT

Anchor brackets/tethers may be used to reinforce a vehicle's resin rear door without substantially increasing the mass of the resin rear door. Such anchor brackets hold an interior trim panel(s) in place, and keep the interior trim panel(s) connected to the door structure or portion(s) thereof. The interior trim panel(s) can act as a protective interior shield that eliminates any exposure of the interior cabin/passenger compartment from any outer (and/or interior) door panel cracks/gaps that may be created during an adverse event. Moreover, conventional interior trim panels may, during a collision, break apart, the broken pieces becoming potentially dangerous projectiles. By being attached to the door structure and/or door componentry, the chance that the interior trim panel (or portions thereof) becoming a projectile is negated or at least lessened.

19 Claims, 5 Drawing Sheets

(51) Int. Cl.
   *B60R 13/02*   (2006.01)
   *B60J 5/04*    (2006.01)

(56) References Cited

U.S. PATENT DOCUMENTS

| | | | | |
|---|---|---|---|---|
| 5,125,815 | A * | 6/1992 | Kargarzadeh | B60R 13/02 |
| | | | | 425/127 |
| 5,181,759 | A | 1/1993 | Doolittle | |
| 5,345,721 | A * | 9/1994 | Stein | B60J 5/0468 |
| | | | | 296/146.7 |
| 5,355,629 | A * | 10/1994 | Kimura | B60J 5/0416 |
| | | | | 49/502 |
| 5,529,370 | A * | 6/1996 | Veit | B60N 2/58 |
| | | | | 296/146.7 |
| 5,762,392 | A * | 6/1998 | Suga | B60R 13/025 |
| | | | | 296/187.05 |
| 5,762,394 | A * | 6/1998 | Salmonowicz | B60J 5/0426 |
| | | | | 49/502 |
| 6,123,385 | A * | 9/2000 | Bailey | B60J 10/75 |
| | | | | 296/146.7 |
| 6,149,224 | A * | 11/2000 | Tiberia | B60R 13/0243 |
| | | | | 296/146.7 |
| 6,394,695 | B1 | 5/2002 | Chausset | |
| 7,380,866 | B2 | 6/2008 | Saitoh | |
| 9,327,667 | B1 | 5/2016 | Raines | |
| 2015/0151359 | A1 * | 6/2015 | Hu | B22C 9/08 |
| | | | | 164/112 |
| 2019/0039533 | A1 * | 2/2019 | Shioda | F16B 5/0657 |
| 2019/0118752 | A1 * | 4/2019 | Tay | B60R 13/0243 |
| 2019/0193535 | A1 * | 6/2019 | Chiba | B60J 5/101 |
| 2019/0275868 | A1 * | 9/2019 | Leterrier | B60J 5/107 |
| 2020/0023721 | A1 * | 1/2020 | Kobayashi | B60J 5/0451 |
| 2020/0070740 | A1 * | 3/2020 | Sorrentino | B60R 13/0243 |
| 2021/0188194 | A1 * | 6/2021 | Koehler | B60R 13/0243 |
| 2021/0285475 | A1 * | 9/2021 | Koehler | B60J 5/0468 |
| 2021/0402934 | A1 * | 12/2021 | Tansingco | B60R 13/0206 |

FOREIGN PATENT DOCUMENTS

| | | | | |
|---|---|---|---|---|
| DE | 102008039962 | | 3/2010 | |
| DE | 102009049361 | | 4/2011 | |
| DE | 102010051530 | | 5/2012 | |
| DE | 102013009923 | A1 * | 3/2014 | B60J 5/0427 |
| DE | 102013109615 | | 3/2015 | |
| DE | 102014019330 | | 6/2016 | |
| JP | 2002362273 | A * | 12/2002 | B60J 5/0425 |
| JP | 2006116997 | | 5/2006 | |
| WO | 2019006271 | | 1/2019 | |

* cited by examiner

COMBINATION INTERIOR TRIM AND REINFORCEMENT FOR EXTERIOR RESIN PANE

TECHNICAL FIELD

The present disclosure relates generally to vehicle doors, and more particularly, to vehicle doors including interior trim panels secured to a vehicle door structure by an anchor bracket to help protect the vehicle interior/passenger compartment from exposure in the event of a gap in the vehicle door structure, and provide impact absorption.

DESCRIPTION OF RELATED ART

Vehicle door structures or assemblies generally include an outer or exterior door panel and an inner or interior door panel. Interior trim panels may also be part of vehicle door structures/assemblies, and are used to cover the interior-facing surface of the outer door panel or interior door panel. Interior trim panels may provide various features/functionality, e.g., house a cup holder or interior door handle, as well as provide a visually acceptable appearance within the vehicle.

In recent years, vehicle doors made of resin have become widely used. However, in the unfortunate event of a collision, vehicle doors made of resin may be susceptible to cracking, thereby potentially exposing the vehicle cabin/passenger compartment, or other deformation.

BRIEF SUMMARY OF THE DISCLOSURE

In accordance with one embodiment, an anchor bracket may comprise a first bar comprising an attachment point, the attachment point effectuating attachment of the anchor bracket simultaneously to a vehicle door structure and to an interior trim panel. The anchor bracket may further comprise a second bar connected to the first bar, the second bar being shaped to accommodate at least one vehicle door component, and in conjunction with the first bar, absorb or transfer at least part of an impact force to the vehicle door structure and away from the interior trim panel.

In some embodiments, the first and second bars comprise flat metal bars having partially rolled edges.

In some embodiments, the second bar is shaped to form an aperture between the second bar and the first bar, and wherein the accommodating of the at least one vehicle door component comprises accepting a door lock cable routed therethrough.

In some embodiments, the first and second bars are connected to each other at a first end distal from an second end in which the attachment point is incorporated.

In some embodiments, one section of the first bar is L-shaped, the attachment point being located along a first portion of the first bar perpendicular to a second portion of the first bar, the first and second portions of the first bar forming the L-shape. In some embodiments, the second portion of the first bar transitions into an obtusely-angled portion that in conjunction with the second bar, forms the shape accommodating the at least one vehicle door component. The obtusely-angled portion is angled away from an outer-facing surface of an interior door panel of the vehicle door structure and towards an outer door panel of the vehicle door structure. In some embodiments, the second bar is connected to the first bar at the second portion of the first bar.

In accordance with another embodiment, a vehicle door assembly, comprises a resin outer door panel, an interior door panel connected to the resin outer door panel, an interior trim panel, and an anchor bracket. The anchor bracket tethers the interior trim panel to the interior door panel, and provides at least one of impact force absorption and transference of impact force from the resin outer door panel throughout the vehicle door assembly.

In some embodiments, the interior trim panel in connection with the anchor bracket tethering the interior trim panel to the interior door panel forms a shield for an interior cabin of a vehicle to which the vehicle door assembly is operatively connected.

In some embodiments, the anchor bracket comprises a loop portion shaped to accommodate at least one component of the vehicle door assembly and provide the at least one of the impact force absorption and the transference of the impact force. In some embodiments, the anchor bracket comprises an L-shaped portion distal from the loop portion such that the loop portion is positioned between the interior door panel and the outer door panel and suspended away from both the interior door panel and the outer door panel.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
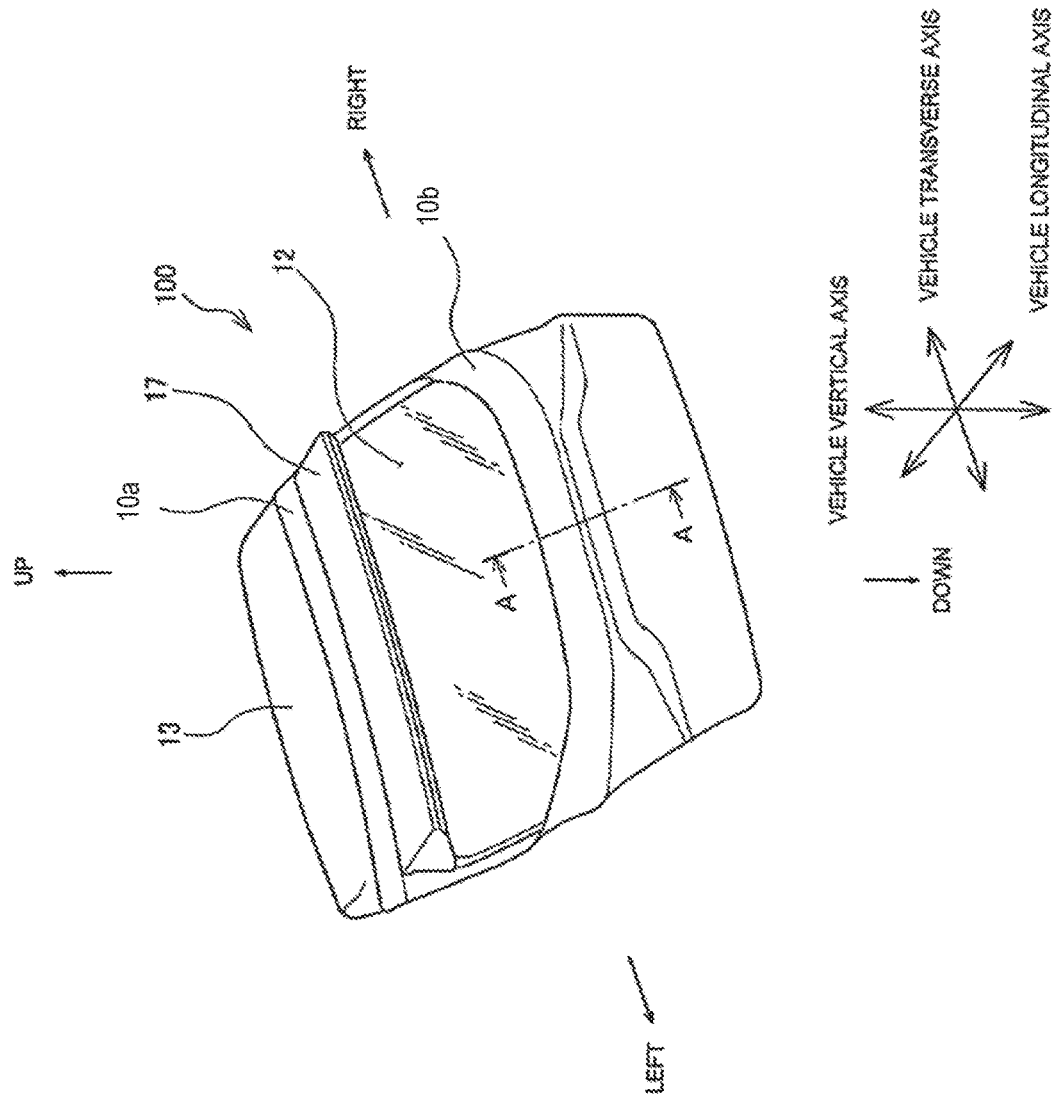
FIG. 1 is a perspective view of a resin rear door of a vehicle.

The figures are not exhaustive and do not limit the present disclosure to the precise form disclosed.

DETAILED DESCRIPTION

As alluded to above, the use of resin rear doors in vehicles has become widespread. Applying a resin structure to rear doors allows vehicle manufacturers to realize bold styling and design. Moreover, the use of resin reduces mass of the rear door. This reduction in mass translates into an overall vehicle reduction in mass, which can aid in improving fuel economy and braking, for example. Additionally, the reduced mass of the rear door allows for easier manipulation by a user (opening/closing) or easier actuation by a power/assisted rear door lift/close mechanism. The use of resin in manufacturing rear doors for vehicles further provides production efficiency improvements.

However, as also noted above, resin doors used in vehicles may be susceptible to cracking, especially in the event of a collision. Thus, gaps may be created through the resin door panels. This can be especially true in the case of resin rear doors in vehicles. For example, in minivans and sport utility vehicles (SUVs), rear doors may not be fully protected by their respective rear bumpers, especially where design trends result in lowering the position of the rear bumper to allow for greater rear cargo space access through the rear door. Such designs can expose the rear door panels to direct loads during a rear collision, and when rear door panels are resin, those direct loads can crack the resin creating a gap(s) that may expose the interior cabin/passenger compartment.

Therefore, and in accordance with various embodiments, one or more anchor brackets/tethers may be used to reinforce a vehicle's resin rear door without substantially increasing the mass of the resin rear door. For example, the increase in mass may be only an approximately 10% to 20% increase in mass. Such anchor brackets hold an interior trim panel(s) in place, and keep the interior trim panel(s) connected to the door structure or portion(s) thereof, e.g., the outer door panel, interior door panel, and/other door component(s). The interior trim panel(s) can act as a protective interior covering or shield that eliminates any exposure of the interior cabin/passenger compartment from any outer (and/or interior) door panel cracks/gaps that may be created during an adverse event, such as a collision. Moreover, conventional interior trim panels may, during a collision, break apart, the broken pieces becoming potentially dangerous projectiles. By being attached to the door structure and/or door componentry, the chance that the interior trim panel (or portions thereof) becoming a projectile is negated or at least lessened. In some embodiments, the interior trim panel can be constructed in a way and/or using a material(s) that enables it to maintain its form/structure without breaking apart, further enhancing its ability to act as a barrier or shield. Further still, the one or more anchor brackets can be configured in such a way that they can absorb or aid in the absorption of impact forces/large deformation while maintaining the position of the interior trim panel(s). In this way, the aforementioned advantages associated with the use of resin doors can be achieved while still ensuring the passenger compartment is protected.

In accordance with some embodiments, the anchor brackets may comprise a first metal bar connected to a second metal bar, wherein the first metal bar is shaped such that upon being connected to the second metal bar, an aperture or loop is defined between the first and second metal bars. The aperture or loop may provide space through which a door lock cable (or other door componentry/portions of the door structure can be routed, as well as provide impact absorption/deformation. The second metal bar may include a mounting hole through which a bolt can be screwed or other retention mechanism can be inserted/connected effectuating attachment of the anchor bracket to the interior trim panel(s) and to the door structure or some component(s) thereof.

A resin rear door 100 of a vehicle according to an embodiment of the present disclosure is described below with reference to the attached drawings. As shown in FIG. 1, the resin rear door 100 can be a flip up door which is pivotably attached to a roof panel 13 at a rear portion of a vehicle body via a pair of hinges (not shown) near the right and left ends of the upper portion of the resin rear door 100. The resin rear door 100 opens and closes a door opening formed at the rear end of the vehicle body by being pivoted up and down about the hinges. The resin rear door 100 includes a resin upper outer door panel 10a, a resin lower outer door panel 10b (both, outer door panel 10), an interior door panel 20, and a reinforcing member 40 secured to the interior door panel 20 (both shown in FIG. 2). In other embodiments, the resin door structure may be disposed on/relative to the interior-facing surface of an outer door portion. In some embodiments, the resin door structure may incorporate a portion of interior trim panel 22 (described in greater detail below). A rear window 12 is disposed in an aperture/window frame of outer door panel 10. Resin rear door 100 may further include a spoiler 17.

Figure 2:
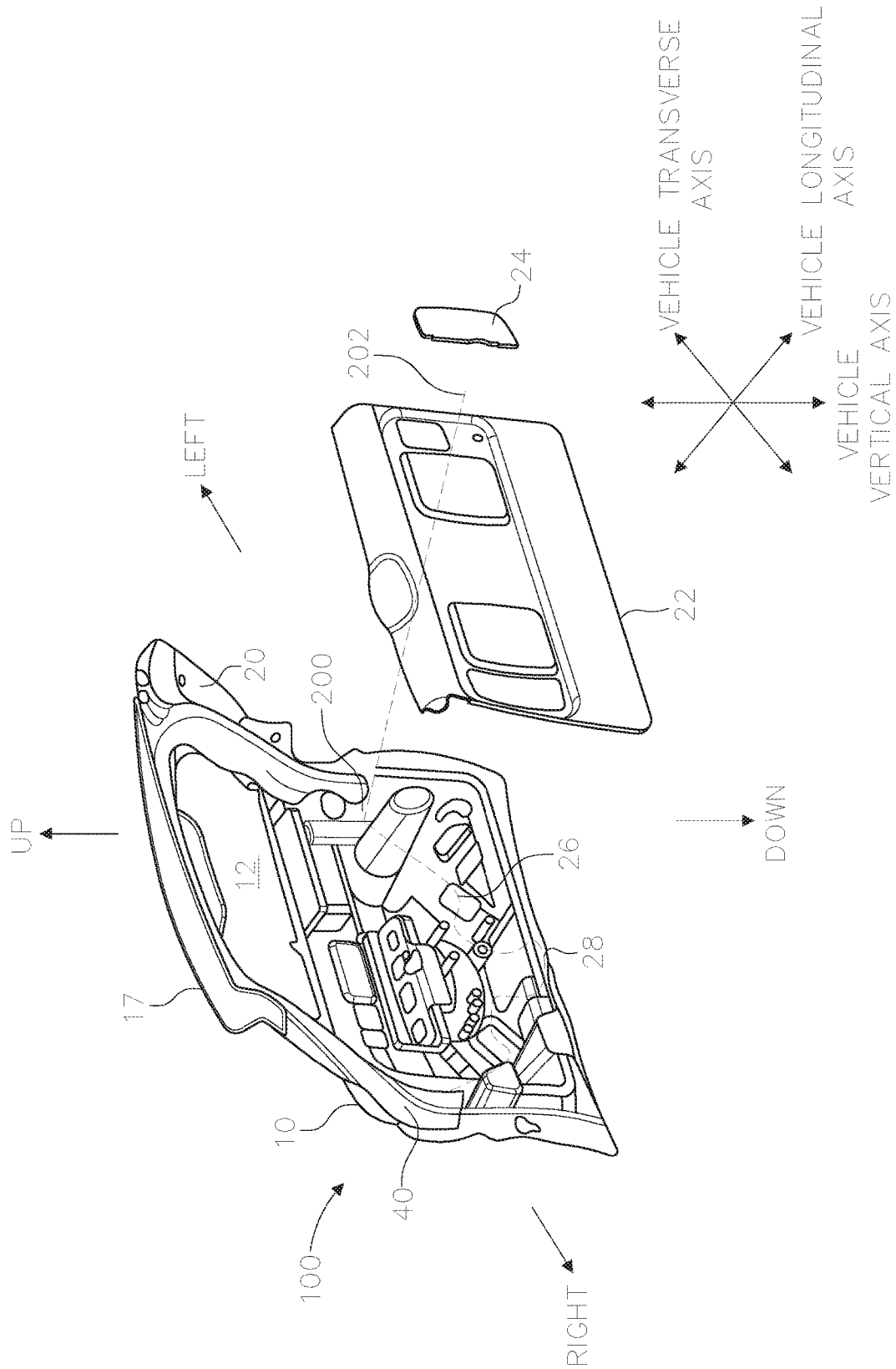
FIG. 2 is an exploded view of a resin rear door assembly of a vehicle.

FIG. 2 illustrates an interior perspective view of resin rear door 100 and interior trim panel 22. A portion of interior door panel 20 is shown for ease of illustration, but should be understood as covering at least a substantial portion of an inner surface of outer door panel 10 and reinforcing member 40. In this embodiment, reinforcing member 40 "outlines" at least a top and left and right side borders of the aperture or window frame within which window 12 is disposed.

Interior trim panel 22 may be resin, a polymer, or other material, and can include certain features, e.g., apertures for access to lighting/lamp assemblies, speakers, etc., and in some instances, a cover for one or more of such apertures 24. As alluded to above, by virtue of its connection to the door structure of resin rear door 100, e.g., interior door panel 20, interior trim panel 22 may act as a barrier or shield. Accordingly, in some embodiments, interior trim panel 22 may be flexible and have strength characteristics depending on the material of construction to withstand any impact forces that may not necessarily be absorbed or transferred (to the door structure) by anchor bracket 200. Moreover, in some embodiments, the size of interior trim panel 22 may be reduced (relative to other elements of resin rear door 100 to realize cost/mass savings.

It should be understood that resin rear door 100 is attached to the roof panel 13 (FIG. 1) with hinges (not shown) secured near the right and left edges of the roof panel 13 by passing bolts through the bolt holes (not shown) of the inner panel 20 and bolt holes (not shown) provided in the one or more areas of reinforcing member 40.

Also illustrated in FIG. 2 is an example anchor bracket 200 disposed between outer door panel 10 and interior trim panel 22, and an attachment point 202 of anchor bracket 200. As alluded to above, attachment point 202 may be a bolt hole in some embodiments. In other embodiments, attachment point 202 may be a friction-based clip or other form of attachment point, e.g., rivet hole. A door lock cable 26 is also depicted, as is a door lock reinforcement 28. Door lock reinforcement 28 may comprise a portion of outer door panel 10 at an inner surface thereof (or a portion of interior door panel 20) that has been, e.g., increased in thickness, to support a door lock assembly (not shown) attached thereto. Door lock cable 26 couples a door handle to the door lock assembly so that movement of the handle in an opening direction causes the cable (or link) to actuate the door lock assembly to unlatch the door lock assemble allowing the door, in this case resin rear door 100, to be opened.

In the illustrated embodiment, anchor bracket 200 connects or attaches to interior trim panel 22, acting as a tether to keep interior trim panel 20 securely in place. When resin rear door 100 is assembled, it can be appreciated that anchor bracket 200 resides between outer door panel 10 and interior trim panel 22. Anchor bracket 200 may simultaneously attach to interior door panel 20. It should be appreciated that interior door panel 20 may be attached to outer door panel 10 to form a door structure of resin rear door 100. In some embodiments, interior door panel 20 may be an interior-facing surface of outer door panel 10. In either instance, attachment of interior trim panel 22 to interior door panel 20 via anchor bracket 200 effectuates reinforcing of the entire door structure (see FIGS. 4, 5), and maintains the positioning of interior trim panel 22 relative to resin rear door 100 or the door structure thereof.

Figure 3:
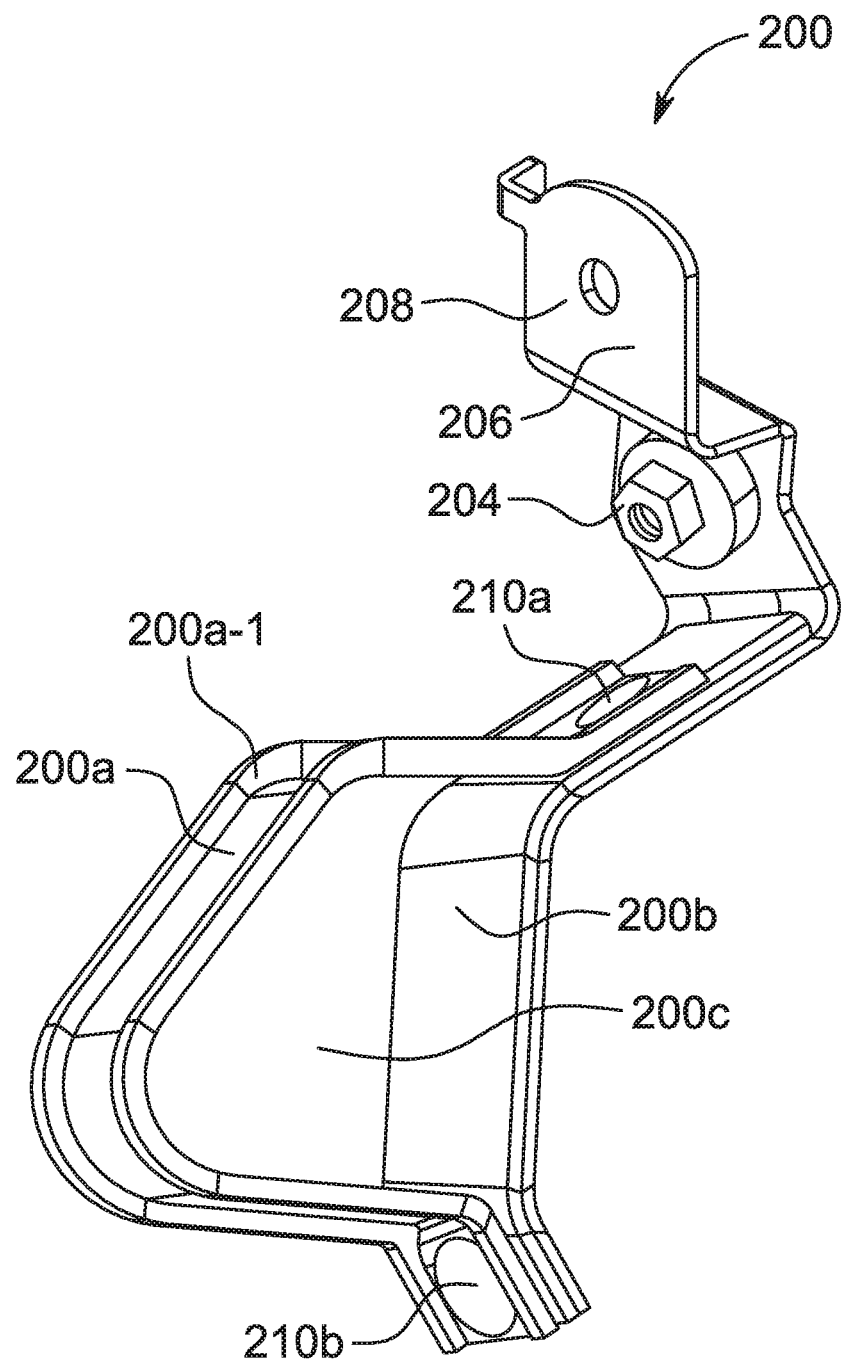
FIG. 3 is a perspective view of an anchor bracket in accordance with one embodiment of the present disclosure.

FIG. 3 illustrates a perspective view of an example anchor bracket 200 in detail. As alluded to earlier, anchor bracket 200 may comprise two metal bars, a first metal bar 200a and a second metal bar 200b. First metal bar 200a may be shaped from a relatively flat metal bar whose edges, in some embodiments, may be turned up or rolled (see 200a-1). This edge treatment may serve, in some embodiments, to increase torsional strength of first metal bar 200a. Second metal bar 200b may similarly be constructed or formed from a flat metal bar, whose edges may also be turned up or rolled. Distal ends of first metal bar 200a may be connected to second metal bar 200b using connectors or attachment mechanisms, in this case, rivets 210a and 210b. By virtue of the shapes of first and second metal bars 200a, 200b, and the manner in which they are connected, an aperture or opening 200c is formed therebetween. As noted above, aperture 200c can accommodate a cable(s) or other door component(s) routed therethrough. In this way, anchor bracket 200 can accomplish its purpose of holding interior trim panel 22 to the door structure of resin rear door 100, allow interior trim panel 22 to act as barrier to a vehicle's passenger compartment, and provide impact absorption/deformation.

As further illustrated in FIG. 3, anchor bracket 200 may include the aforementioned attachment point 202 (hidden from view) through which a bolt 204, in one embodiment, may pass to effectuate attachment of anchor bracket 200 to interior trim panel 22 and, e.g., interior door panel 20, described in greater detail below with respect to FIGS. 4, 5. Again, in other embodiments a rivet, clip, or other attachment mechanism may be used. Further still, a second attachment point 206 may include a secondary aperture 208 through which a secondary/supplementary attachment mechanism (bolt, rivet, etc.) can be used to provide an additional attachment point for anchor bracket 200 to attach to, e.g., interior door panel 20, or other component of resin rear door 100.

Figure 4:
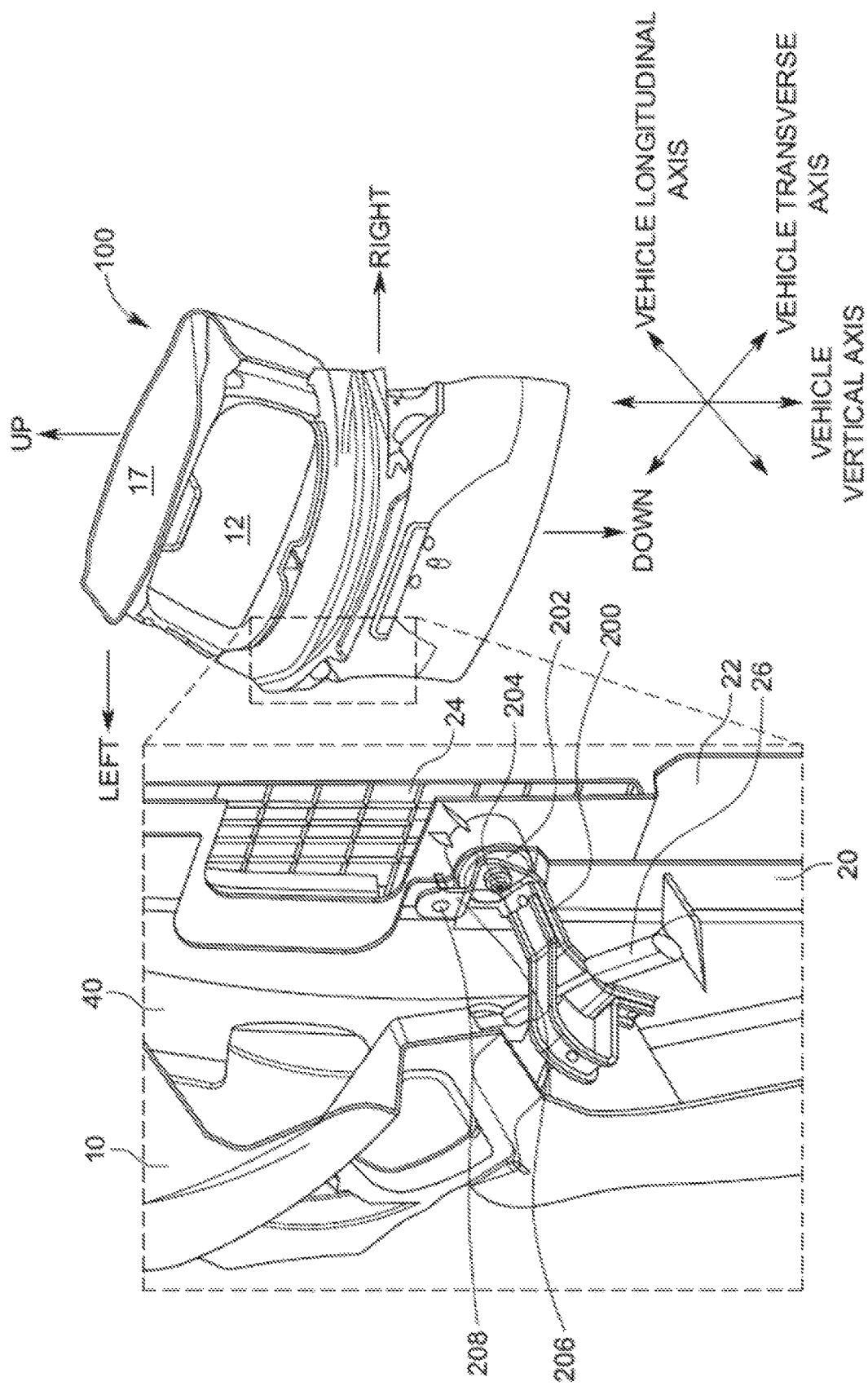
FIG. 4 is a cut-away perspective view of the anchor bracket installed within a resin rear door assembly of FIG. 2.

FIG. 4 is a cut-away perspective view of resin rear door 100 illustrating anchor bracket 200 in its attached state. As illustrated in FIG. 4, anchor bracket 200 is attached at least using a bolt 204 that, in this embodiment, going in a rearward to forward direction along the vehicle's longitudinal axis, goes through aperture 202, a corresponding hole or aperture in interior door panel 20, and through a corresponding hole or aperture in interior trim panel 22. Also illustrated in FIG. 4 is door lock cable 26 being routed between first and second metal bars (200a, 200b shown in FIG. 3)/aperture 200c (shown in FIG. 3). It should be understood that installation of anchor brackets such as anchor bracket 200 can be accomplished by accessing the interior of the door structure of resin rear door 100 (between outer door panel 10 and interior door panel 22) through speaker apertures, lamp apertures, service doors, etc. In other embodiments, anchor brackets may be secured prior to outer door panel 10 (or interior door panel 20) from being secured together.

Figure 5:
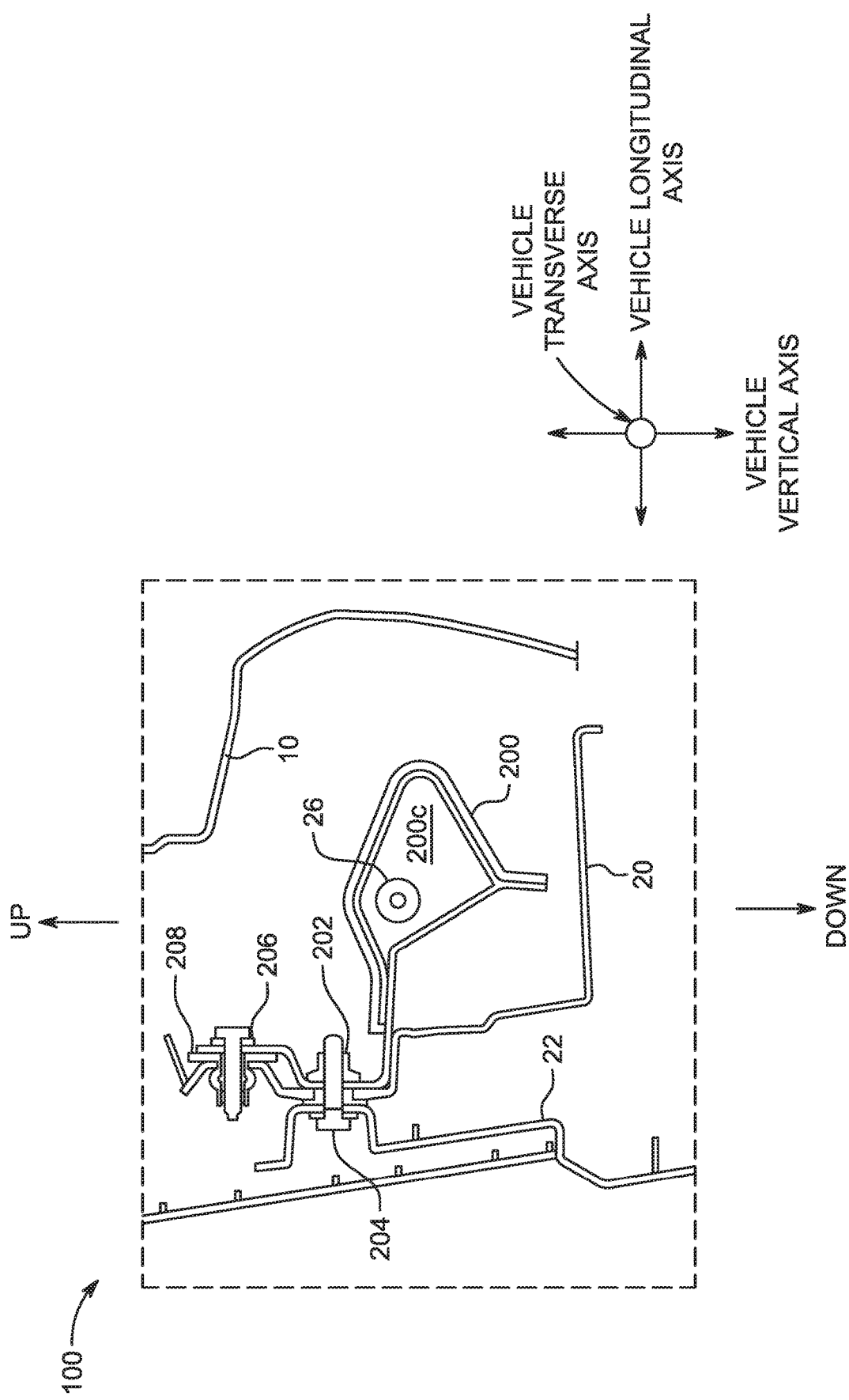
FIG. 5 is a cross-sectional view of the anchor bracket installed within a resin rear door assembly of FIG. 2.

FIG. 5 is a cross-sectional view of resin rear door 100. Again, anchor bracket 100 may attach to interior trim panel 22 and, in this illustrated embodiment, interior door panel 20, using a bolt 204 secured through a hole 202 of anchor bracket 200 and corresponding holes in interior door panel 20 and interior trim panel 22. Door lock cable 26 (shown in cross-section) is illustrated as being routed through aperture 200c of anchor bracket 200. It should be appreciated that given the orientation of anchor bracket 200 relative to interior door panel 20 and outer door panel 10, a crushing impact to outer door panel 10 can be absorbed, at least in part, by anchor bracket 200. Anchor bracket 200 can also deform without transferring the force of impact (or at least mitigating the force of impact) to interior door panel 20 and/or interior trim panel 22.

It should be noted that various methods of connection to an interior door panel, interior trim panel, and/or other door component(s) are contemplated and not limited to embodiments explicitly described herein. Moreover, various shapes/configurations of the anchor brackets are also contemplated and not limited to embodiments explicitly described herein. For example, depending on the various surfaces of, e.g., an outer door panel, and interior trim panel, mechanisms for door locks, windows/window adjustment and/or locking mechanisms, etc. the shape of anchor brackets or portions of anchor brackets can vary to accommodate such variations. Additionally, the amount of deformation absorption, the distance between the respective surfaces of the outer door and interior trim panels may also dictate, at least in part, the shape of the anchor bracket. That is, the second metal bar or arm may, in one embodiment be shaped to accommodate a greater distance spanning an outer door panel and an interior trim panel than in another embodiment. In another embodiment, the anchor bracket may be configured to attach to an interior-facing surface of the outer door panel. In another embodiment, the anchor bracket may be configured to attach to both panels. In some embodiments, the aperture or loop formed between the first and second metal bars may be sized according to that distance.

Moreover, other materials or combinations of materials used to manufacture the disclosed anchor brackets are contemplated, e.g., carbon fiber, polymer, elastomer, etc. Many other variations are contemplated herein and would be understood by those of ordinary skill in the art while retaining the novel characteristics and functionality of providing interior trim panel reinforcement/connection to an outer door panel, and providing protection from gaps/cracks in the outer door panel, as well as providing some impact or direct load buffering.

Further still, although various embodiments of anchor brackets have been described as comprising two metal bars, other embodiments contemplate a monolithic anchor bracket or an anchor bracket having more than two components. In other contemplated embodiments, an anchor bracket may be made of a differently shaped elements/components such as cylindrical bars rather than flat bars, etc. Moreover, in the case where multiple components, e.g., metal bars, make up an anchor bracket, the manner and location(s) of connection can vary as would be readily understood by those of ordinary skill in the art.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional or physical partitioning and configurations can be implemented to implement the desired features of the technology disclosed herein. Also, a multitude of different constituent module names other than those depicted herein can be applied to the various partitions.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An anchor bracket for a vehicle door, the anchor bracket comprising:
    a first bar comprising:
        an attachment point, the attachment point effectuating attachment of the anchor bracket simultaneously to an interior door panel of the vehicle door and to an interior trim panel of the vehicle door via an attachment mechanism, and
        first and second ends; and
    a second bar coupled to the first and second ends of the first bar to form a closed loop aperture, the second bar extending from the first end of the first bar to the second end of the first bar;
    wherein the anchor bracket extends from the attachment point at the interior door panel toward an outer door panel, and wherein a length of the anchor bracket in a first direction from the interior door panel toward the outer door panel is greater than a width of the anchor bracket in a second direction along the width of door of the vehicle.

2. The anchor bracket of claim 1, wherein the attachment point is mounted in the vehicle and circumscribes the vehicle door, and wherein the vehicle door comprises a door lock cable.

3. The anchor bracket of claim 1, wherein the attachment point includes a first portion of the first bar perpendicularly coupled to a second portion of the first bar, wherein the first portion of the first bar and the second portion of the first bar form an L-shape.

4. The anchor bracket of claim 3, wherein the L-shaped portion of the second bar is an obtusely-angled portion that in conjunction with the first bar forms the closed loop aperture accommodating the vehicle door, the obtusely-angled portion being angled away from an outer-facing surface of an interior door panel of a vehicle door structure and towards an outer door panel of the vehicle door structure.

5. The anchor bracket of claim 1, wherein the closed loop aperture is configured to absorb or transfer at least part of an impact force to an vehicle door structure away from the interior trim panel.

6. The anchor bracket of claim 1, where in the first bar and the second bar are shaped such that the anchor bracket circumscribes a vehicle door component.

7. The anchor bracket of claim 1, wherein the anchor bracket extends from the attachment point at the interior door panel toward the outer door panel without physically contacting the outer door panel.

8. The anchor bracket of claim 1, wherein a length of the second bar extending from a first distal end of the first bar to a second distal end of the first bar is greater than a width of the second bar.

9. An anchor bracket for a vehicle door, comprising:
    a first bar, comprising an attachment point configured to attach the anchor bracket simultaneously to an interior door panel of the vehicle door and an interior trim panel of the vehicle door; and
    a second bar, coupled to a first and second end of the first bar to form a closed loop aperture circumscribing a vehicle door component, the second bar comprising an L-shaped portion extending from the first end of the first bar to the second end of the first bar, and a length of the second bar extending from the first end of the first bar to the second end of the first bar is greater than a width of the second bar.

10. The anchor bracket of claim 9, wherein the anchor bracket extends from the attachment point at the interior door panel toward an outer door panel, and wherein a length of the anchor bracket in a first direction from the interior door panel toward the outer door panel is greater than a width of the anchor bracket in a second direction along the width of the door of the vehicle.

11. The anchor bracket of claim 10, wherein the anchor bracket extends from the attachment point at the interior door panel toward the outer door panel without physically contacting the outer door panel.

12. A vehicle door assembly for a vehicle door, the vehicle door assembly comprising:
    a resin outer door panel;
    an interior door panel connected to the resin outer door panel;
    an interior trim panel; and
    an anchor bracket disposed between the resin outer door panel in the interior door panel, the anchor bracket comprising:

a first bar comprising:
  an attachment point coupled simultaneously to the interior door panel of the vehicle door and the interior trim panel, and
  first and second ends; and
a second bar coupled to the first and second ends of the first bar, the second bar extending from the first end of the first bar to the second end of the first bar;
wherein the anchor bracket extends from the attachment point at the interior door panel toward the outer door panel, and wherein a length of the anchor bracket in a first direction from the interior door panel toward the outer door panel is greater than a width of the anchor bracket in a second direction along the width of the door of the vehicle.

13. The vehicle door assembly of claim 12, wherein the interior trim panel in connection with the anchor bracket tethering the interior trim panel to the interior door panel forms a shield for an interior cabin of a vehicle to which the vehicle door assembly is operatively connected.

14. The vehicle door assembly of claim 12, wherein the anchor bracket is configured to provide at least one of: (i) impact force absorption or (ii) the transference of impact force.

15. The vehicle door assembly of claim 14, wherein an L-shaped portion extending from the interior trim panel is is suspended away from both the interior door panel and the resin outer door panel.

16. The vehicle door assembly of claim 12, wherein the anchor bracket is configured to:
  tether the interior trim panel to the interior door panel; and
  provide at least one of: (i) impact force absorption, or (ii) transference of impact force from the resin outer door panel throughout the vehicle door assembly.

17. The vehicle door assembly of claim 12, where in the first bar and the second bar are shaped such that the anchor bracket circumscribes a vehicle door component.

18. The vehicle door assembly of claim 12, wherein the anchor bracket extends from the attachment point at the interior door panel toward the resin outer door panel without physically contacting the outer door panel.

19. The vehicle door assembly of claim 12, wherein a length of the second bar extending from the first end of the first bar to the second end of the first bar is greater than a width of the second bar.

\* \* \* \* \*